United States Patent [19]

Heller

[11] 4,310,405
[45] Jan. 12, 1982

[54] DEVICE FOR THE PHOTOELECTROCHEMICAL GENERATION OF HYDROGEN AT P-TYPE SEMICONDUCTOR ELECTRODES

[75] Inventor: Adam Heller, Bridgewater, N.J.

[73] Assignee: Bell Telephone Laboratories, Incorporated, Murray Hill, N.J.

[21] Appl. No.: 190,017

[22] Filed: Sep. 23, 1980

[51] Int. Cl.$^3$ ............................................. C25B 1/02
[52] U.S. Cl. ................................ 204/252; 204/129; 204/DIG. 3; 429/111
[58] Field of Search ......... 204/128, 129, 252, DIG. 3; 429/111

[56] References Cited

PUBLICATIONS

A. Heller et al., "An Efficient Photocathode for Semiconductor Liquid Junction Cells . . . ", J. Am. Chem. Soc., vol. 102, pp. 6555–6556 (Oct. 1980).
A. Fujishima et al., "Electrochemical Photolysis of Water at a Semiconductor Electrode", Nature, vol. 238, pp. 37–38 (1972).
D. C. Bookbinder et al., "Photoelectrochemical Reduction of N,N'–Dimethyl-4-4'bipyridinium in Aqueous Media . . . , J. Am. Chem. Soc., vol. 101, pp. 7721–7723 (1979).
J. O'M. Bockris et al., "The Rate of the Photoelectrochemical Generation of $H_2$ at p–Type Semiconductors", J. Electrochem. Soc., vol. 124, pp. 1348–1355 (1977).
A. A. K. Vervaet et al., "Some Electrochemical Processes at the n–and p–Type InP Electrodes", J. Electroanal. Chem., vol. 91, pp. 133–136 (1978).

Primary Examiner—Aaron Weisstuch
Attorney, Agent, or Firm—Richard D. Laumann

[57] ABSTRACT

A device having a p-type electrode comprising InP or Si and an electrolyte comprising a redox couple and a hydrogen catalyst evolves hydrogen at the p-type electrode when illuminated.

7 Claims, 1 Drawing Figure

DEVICE FOR THE PHOTOELECTROCHEMICAL GENERATION OF HYDROGEN AT P-TYPE SEMICONDUCTOR ELECTRODES

TECHNICAL FIELD

This invention relates generally to solar energy conversion devices and particularly to solar energy conversion devices useful for the photoelectrochemical generation of hydrogen.

BACKGROUND OF THE INVENTION

Concern over the availability and environmental consequences of fossil fuel energy sources has generated interest in recent years in the search for and development of alternative energy sources which would complement, and perhaps replace, fossil fuel sources. Numerous alternative energy sources have been contemplated including both nuclear and solar energy. Several approaches directed toward the use of solar energy have been and are being investigated. For example, solar energy devices may be used to produce electricity either directly through photovoltaic devices or indirectly through thermal devices. A third approach is photoelectrolysis and involves the use of sunlight to split water into oxygen and hydrogen. After the water is split, the hydrogen and oxygen may be collected and the hydrogen utilized as a fuel. This approach is attractive because hydrogen is more easily stored than electricity or heat and is easily used as a fuel.

Although many structures and material combinations have been contemplated, the devices presently considered useful for photoelectrolysis may be described briefly as having two electrodes immersed in an electrolyte and connected via an external electrical circuit. One of the electrodes will be formed from a semiconductor material and shining sunlight on it causes creation of electron-hole pairs as the incident light is absorbed. At one electrode, electrons move to the electrolyte and hydrogen is produced while at the other electrode, holes move to the electrolyte and oxygen is produced. This description assumes that the flatband potentials are above the $H^+/H_2$ potential and no external bias is needed to produce $H_2$ and $O_2$. If the flatband potential is below the $H^+/H_2$ potential, an external bias will be required.

Although Becquerel constructed the first photoelectrochemical cell in 1839, most work with such cells has been of a fundamental nature and did not lead to widespread commercial use of such cells. However, in recent years, several systems have been proposed that are more serious candidates for commercial use. For example, Fujishima and Honda, *Nature*, 238, pp. 37-38, July 7, 1972, proposed to use a cell having a $TiO_2$ electrode and a platinum counterelectrode to produce oxygen at the $TiO_2$ electrode and hydrogen at the platinum electrode. In 1976, several groups disclosed devices using a strontium titanate ($SrTiO_3$) electrode in a cell similar to that of Fujishima and Honda to generate hydrogen and oxygen.

One of the recurring problems in producing useful photoelectrochemical cells is the possibility that one of the electrodes, generally composed of a semiconductor material, may undergo irreversible decomposition. Such decomposition did not occur for the $TiO_2$ or $SrTiO_3$ cells, but they suffered from another problem, namely, poor solar to hydrogen conversion efficiency. Both materials have large bandgaps, approximately 3 eV, and are responsive to only a relatively small percentage of the incident sunlight. Thus, stabilization of cells using semiconductor materials having smaller bandgaps would be desirable.

Another approach, which attempted to increase the conversion efficiency, is described by Bookbinder, et al in *Journal of the American Chemical Society*, pp. 7721-7723, Dec. 19, 1979. This approach uses a semiconductor having a bandgap lower than that of $TiO_2$ and also involves the manipulation of the charge-transfer kinetics by either a sacrificial reagent or catalyst. The paper reported a cell having a p-type silicon photocathode and a platinum anode separated by a separator. The three components were immersed in an aqueous electrolyte with one electrode in each of the two electrode compartments. The photocathode compartment further comprised N,N'-dimethyl-4,4,4'-bipyridinium ($PQ^{2+}$). $PQ^{2+}$ is photoreduced at the p-type silicon electrode and the reduced $PQ^+$ reacts with water over a catalyst to form gaseous hydrogen as the $PQ^+$ is oxidized from $PQ^+$ to $PQ^{2+}$. An external applied voltage of at least approximately 0.8 volts is required to reach the 1.23 volts thermodynamically required to split $H_2O$.

SUMMARY OF THE INVENTION

The invention is a device comprising a first electrode, a second electrode comprising a p-type semiconductor electrode, a voltage source connected to said first and second electrodes, a liquid electrolyte, a separator in said electrolyte forming first and second electrode compartments having said first and second electrodes, respectively, said electrolyte in said second compartment further comprising a redox couple selected from the group consisting of $V^{2+}/V^{3+}$, $Nb^{4+}/Nb^{5+}$, and $Ti^{3+}/Ti^{4+}$ cations, and a hydrogen evolution catalyst selected from the group consisting of ruthenium, iridium, platinum, rhodium, and compounds thereof. The device produces hydrogen when the p-type semiconductor electrode is illuminated. The p-type semiconductor, in a preferred embodiment, is selected from the group consisting of InP and Si. In an especially preferred embodiment, the electrode is InP, the redox couple is $V^{2+}/V^{3+}$ and the hydrogen evolution catalyst is ruthenium. In a further preferred embodiment, the cell has a pH of three or less.

DETAILED DESCRIPTION

Figure 1:
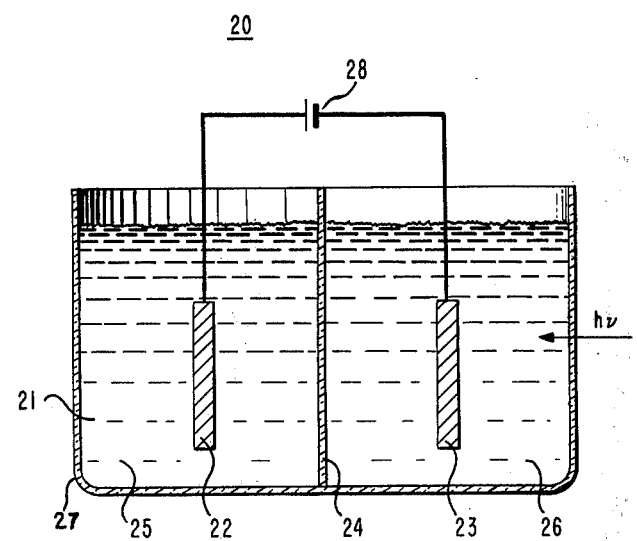
FIG. 1 is a schematic representation of a hydrogen producing device of this invention.

The device 20 depicted in the FIG. 1 comprises a container 27, a liquid electrolyte 21, a first electrode 22, a second electrode 23 and a separator 24 in the electrolyte. The separator forms a first electrode compartment 25 and a second electrode compartment 26 in the electrolyte and which contain the first electrode 22 and the second electrode 23, respectively. The first electrode may be any inert material such as carbon. The second electrode comprises a p-type semiconductor material. The electrolyte is an aqueous solution which contains a redox couple and a hydrogen evolution catalyst in the second electrode compartment. The second electrode 23 may be covered with epoxy, except where illuminated, to insulate it from the electrolyte. The container may be made of any conveniently available glass or plastic material that is inert with respect to the electrolyte. One surface of the cell is transparent so that incident light, indicated as hv, may pass through the container wall to the second electrode 23. An external circuit comprises voltage source 28 which is connected to said first and said second electrodes.

Although carbon may be used for the first electrode material, it is preferable to use a material on which $O_2$ evolution kinetics are more rapid. Such materials are exemplified by Ru, Ir, and Pt and their oxides on a carrier such as $TiO_2$ or carbon.

The electrolyte in the second compartment further comprises a redox couple selected from the group consisting of $V^{2+}/V^{3+}$, $Nb^{4+}/Nb^{5+}$ and $Ti^{3+}/Ti^{4+}$ cations. The electrolyte in said second compartment further comprises a hydrogen evolution catalyst selected from the group consisting of ruthenium, rhodium, palladium and platinum and compounds thereof. The redox coupled concentration must be sufficient so that the cations are transported to the photoactive electrode in an amount sufficient to react with the flux of photogenerated electrons. The proton concentration should be sufficient for a pH of 3 or less. This concentration permits the rapid evolution of hydrogen as will be described later. The semiconductor electrode, in preferred embodiments, comprises a semiconductor selected from the group consisting of InP and Si.

Preparation of the $V^{2+}/V^{3+}$ couple and the InP and Si electrodes will be described and it is believed that methods of preparing other couples and semiconductors will then be apparent to those skilled in the art. The electrolyte containing $V^{2+}/V^{3+}$ coupled is conveniently prepared by dissolving the requisite amount of $V_2O_5$ in sufficient HCl to provide a solution which, after reaction with a sufficient amount of material, such as Zn, added in small excess over the $V^{5+} \rightarrow V^{2+}$ stoichiometry, yields a 4 M solution of HCl upon completion. Other vanadium oxides or chlorides might be used as well and reducing agents other than zinc might also be used. The redox coupled concentration must be sufficient to react with the electrons coming to the surface of the electrode upon illumination of the cell. A concentration of approximately 0.35 molar has been found sufficient for solar illumination at Murray Hill, New Jersey.

Surface preparation yielding a nonreflective surface has been found to be important in increasing efficiency. A matte black surface on the A face of InP is obtained by etching the crystal for approximately 30 to 60 seconds in a 2:2:1 solution of $HNO_3$, $H_2O$, and HCl. A 6:6:1 solution of the same compounds yields an almost shiny A face of InP in photocells of efficiency smaller than obtained with a 2:2:1 solution. Si may be etched with a 5:5:3 solution of $HNO_3:CH_3COOH:HF$ plus one percent bromine.

The separator may be formed from material such as a cation transfer membrane (61AZL 386 or NAFION manufactured by Ionics and DuPont, respectively) when the complex in solution is anionic or an anion transfer membrane (103PZL 386 manufactured by Ionics) when the complex in solution is cationic.

Acids other than HCl, including acids such as phosphoric, sulfuric and hydrobromic, may be used provided they do not cause any photocorrosion of the semiconductor electrode. Hydrochloric acid may be used in concentrations up to six molar without causing photocorrosion. The complexing anion added to the solution will depend upon the acid used and will, in general, shift the potential of the redox couple with respect to the $H^{3O}/H_2$ electrode potential. Although any redox potential that is more reducing than the $H^+/H_2$ electrode will result in hydrogen evolution, operation close to the hydrogen potential is desirable to reduce energy losses. However, operation too close to the $H^{3O}/H_2$ electron potential may result in very slow hydrogen evolution. A redox couple potential in the range between 0.020 and 0.6 volts more reducing than the $H^+/H_2$ electrode is desirable.

The second electrode compartment comprises, in addition to the redox couple, a catalyst which facilitates the evolution of hydrogen. Hydrogen evolution proceeds via a reaction such as $V^{2+} + H^+ \rightarrow V^{3+} + (\frac{1}{2})H_2$. The $V^{3+}$ then reacts with a photogenerated electron coming to the semiconductor surface to form $V^{2+}$. Ruthenium and ruthenium compounds may be used as a catalyst. The catalyst can be added as a solution such as in the form of $RuCl_3.3H_2O$ in dilute HCl or as a solid, for example, a platinum wire. It is not known with certainty whether the ruthenium, after reacting with the solution, is present as an ion or as a colloidal solid. Other useful catalyst materials include platinum, palladium, rhodium and compounds thereof.

Thermodynamic considerations prevent the decomposition of water unless a voltage of 1.23 volts is applied. Under illumination with an InP electrode, an external voltage of at least 0.6 volts is required for hydrogen evolution. This voltage is applied by voltage source 28.

Modifications of the cell are readily thought of. For example, the electrolyte in the first electrode compartment may further comprise a redox couple which facilitates oxygen evolution.

I claim:

1. A device comprising a first electrode, a second electrode comprising a p-type semiconductor, a voltage source connected to said first and second electrodes, a liquid electrolyte, a separator in said electrolyte and forming first and second electrode compartments having said first and second electrodes, respectively, characterized in that
said electrolyte in said second compartment further comprises a redox couple selected from the group consisting of $V^{2+}/V^{3+}$, $Nb^{4+}/Nb^{5+}$ and $Ti^{3+}/Ti^{4+}$ cations and a hydrogen evolution catalyst selected from the group consisting of ruthenium, rhodium, palladium, platinum and compounds thereof.

2. A device as recited in claim 1 in which said redox couple has a potential in the range between 0.020 and 0.6 volts more reducing than the $H^+/H_2$ electrode.

3. A device as recited in claim 2 in which said p-type semiconductor comprises a member selected from the group consisting of InP and Si.

4. A device as recited in claim 3 in which said electrolyte has a pH less than or equal to 3.

5. A device as recited in claim 4 in which said p-type semiconductor is InP.

6. A device as recited in claim 2 or 5 in which said catalyst comprises ruthenium.

7. A device as recited in claim 6 in which said catalyst is added to said electrolyte as $RuCl_3.3H_2O$.

* * * * *

UNITED STATES PATENT AND TRADEMARK OFFICE
CERTIFICATE OF CORRECTION

PATENT NO. : 4,310,405
DATED : January 12, 1982
INVENTOR(S) : Adam Heller

It is certified that error appears in the above—identified patent and that said Letters Patent is hereby corrected as shown below:

Column 3, lines 17 and 18, "coupled" should read --couple--. Column 3, line 39, "coupled" should read --couple--. Column 4, line 3, "$H^{30}/H_2$" should read --$H^+/H_2$--. Column 4, line 8, "$H^{30}/H_2$ electron" should read --$H^+/H_2$ electrode--.

Signed and Sealed this

Eleventh Day of May 1982

[SEAL]

Attest:

Attesting Officer

GERALD J. MOSSINGHOFF

Commissioner of Patents and Trademarks